United States Patent Office.

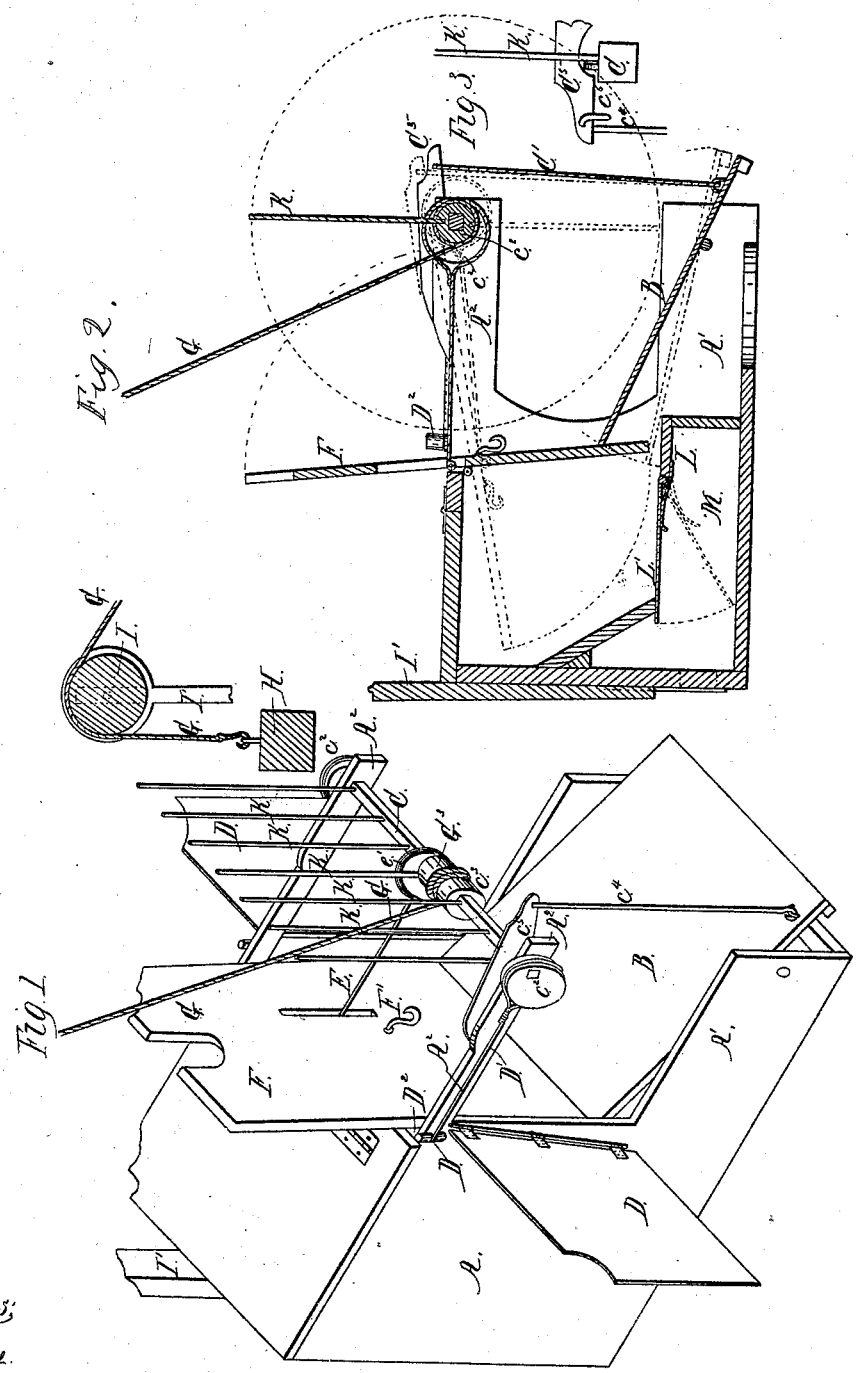

J. P. EMSWILER, OF KNIGHTSTOWN, INDIANA.

Letters Patent No. 66,007, dated June 25, 1867.

---

IMPROVEMENT IN ANIMAL TRAPS.

---

*The Schedule referred to in these Letters Patent and making part of the same.*

---

TO ALL WHOM IT MAY CONCERN:

Be it known that I, J. P. EMSWILER, of Knightstown, in the county of Henry, and State of Indiana, have invented a new and useful Improvement in Rat-Traps; and I do hereby declare that the following is a full, clear, and exact description of the same, reference being had to the annexed drawings, making part of this specification, in which—

Figure 1 is a perspective view.
Figure 2 is a vertical longitudinal section through the centre.
Figure 3 is an enlarged elevation showing the trigger.

The same letters are employed in all the figures in the indication of identical parts.

A is the body of the trap, having a projection, $A^1$, extended in front on each side from the bottom part of the sides, and another, $A^2$, parallel thereto from the top part of the sides. To the front part of the projection $A^1$ is attached a platform, inclining upward from front to rear. This platform is pivoted to the sides near the end of projection $A^1$ so as to have a vertical oscillation. The platform is connected with the trigger by the rod $C^4$. C is a shaft, the journals of which pass through and are supported by the projection $A^2$. In the middle of the shaft is the eccentric $C^1$; on each end, outside the bearings, the eccentrics $C^2$ $C^2$. A spool, $C^3$, is placed on the shaft, around which is wound the cord G, when the trap is set, and by which the shaft is caused to revolve. The rod $C^4$ connects the oscillating platform B with the trigger $C^5$. The trigger is pivoted to the projection $A^2$, so as to swing vertically. It has a notch cut on its under edge to receive the projection $C^6$ on the shaft C. The eccentrics $C^2$ are connected by the rods $D^1$ (which are attached to them by suitable straps) to the projections $D^2$ upon the back and near the hinge of the doors D, which close the space between the projections $A^1$ and $A^2$ on each side, hung to the sides A as shown in the drawings. The eccentric $C^1$ is in like manner connected by the rod E with the door F, which is swung upon pivots from the sides A and, when vertical, closes the front of the box A, and when horizontal covers the space over the platform between the chamber A and the shaft C, as shown in fig. 2 by the red lines. The cord G extends from the spool $C^3$ upward over the pulley I, upon the standard $I'$, and has fastened to its end the weight H. K K are fingers projecting from the shaft C, made as long as they can be, and clear the platform B in revolving. A falling door, $L'$, is placed in the bottom of the upper one of the two chambers into which the body of the trap is divided. This door is hinged on the front side and is supported by a spring, L, which is just staunch enough to support the weight of the door $L'$, but will yield to any increased weight resting upon it. Below this door is the lower chamber M.

The mode of operating this trap is as follows: The cord is wound round the spool $C^3$ and carried over the pulley I with the weight attached. The shaft is prevented from revolving by the hook in the trigger $C^5$, which bears against the projection $C^6$. The bait is attached to the hook $F'$ or placed upon the platform B. When a rat ascends the platform to get at the bait his weight will disengage the trigger by bearing down the platform, raising the rod $C^4$. This releases the shaft, which is caused to revolve by the weight H. This revolution carries with it the eccentrics, which instantly close the doors D and F, the latter at the same time opening the end of the upper chamber, into which the rat will be violently thrown by the revolution of the fingers K, and, falling upon the door L, it will open and allow him to fall into the lower chamber M, the door instantly closing again by the action of the spring L. The shaft will make an entire revolution, closing and again opening the doors, catching again upon the trigger and leaving the trap ready to repeat the action. The number of repetitions is dependent upon the length of the cord G and the height of the standard $I'$. Suitable doors are arranged to give access to the upper and lower chambers. Instead of the fingers K, flat pieces or strips may be used.

What I claim as my invention, and desire to secure by Letters Patent, is—

1. In a rat-trap, the combination of devices for disengaging the shaft C and actuating the fingers K and doors D and F, substantially as described.

2. The combination of the revolving-fingers K, shaft C, eccentrics $C^1$, rod E, and door F, substantially as described.

3. The combination of the revolving-fingers K, shaft C, eccentrics $C^2$, rods $D'$, and doors D, substantially as and for the purpose set forth.

4. In combination with the revolving-shaft C and fingers K and automatically acting door F, opening into the upper chamber, I claim the door L opening into the lower chamber, substantially as and for the purpose set forth.

In testimony whereof I have signed my name to this specification in the presence of two subscribing witnesses.

J. P. EMSWILER.

Witnesses:
DAVID S. HOLLOWAY,
E. F. HOLLOWAY.